(12) United States Patent
Han et al.

(10) Patent No.: US 12,449,778 B2
(45) Date of Patent: Oct. 21, 2025

(54) APPARATUS AND METHOD FOR OPERATING ENERGY STORAGE SYSTEM

(71) Applicant: KOREA INSTITUTE OF ENERGY RESEARCH, Daejeon (KR)

(72) Inventors: Gwang Woo Han, Daejeon (KR); Jong Kyu Kim, Sejong-si (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 332 days.

(21) Appl. No.: 17/994,071

(22) Filed: Nov. 25, 2022

(65) Prior Publication Data
US 2023/0213907 A1 Jul. 6, 2023

(30) Foreign Application Priority Data

Dec. 30, 2021 (KR) .................. 10-2021-0192771

(51) Int. Cl.
*G05B 19/042* (2006.01)
*G06N 3/092* (2023.01)
*G06N 7/01* (2023.01)
*H02J 3/00* (2006.01)

(52) U.S. Cl.
CPC ........... *G05B 19/042* (2013.01); *G06N 3/092* (2023.01); *G05B 2219/2639* (2013.01)

(58) Field of Classification Search
CPC .......... G05B 19/042; G05B 2219/2639; G06N 3/092; G06N 3/0442; G06N 3/082; G06N 3/084; G06N 3/09; G06N 7/01; H02J 3/381; H02J 3/003; H02J 3/008; G06Q 50/06; Y04S 20/222

USPC ........................................................ 700/291
See application file for complete search history.

(56) References Cited

U.S. PATENT DOCUMENTS

2019/0115753 A1* 4/2019 Sheehan ............ G05B 13/0265

FOREIGN PATENT DOCUMENTS

| JP | 2019-109638 A | 7/2019 |
|---|---|---|
| KR | 10-2016-0028880 A | 3/2016 |
| KR | 10-1961703 B1 | 3/2019 |
| KR | 10-2019-0112441 A | 10/2019 |
| KR | 10-2020-0069122 A | 6/2020 |
| KR | 10-2020-0104543 A | 9/2020 |
| KR | 10-2021-0092581 A | 7/2021 |

OTHER PUBLICATIONS

Han et al., "Deep-learning- and reinforcement-learning-based profitable strategy of a grid-level energy storage system for the smart grid", Journal of Energy Storage, vol. 41, No. 102868, 2021, pp. 1-13.

(Continued)

*Primary Examiner* — Michael J Brown
(74) *Attorney, Agent, or Firm* — Birch, Stewart, Kolasch & Birch, LLP

(57) ABSTRACT

The present disclosure relates to an operating device and method of an ESS. The ESS operating method may include forecasting electricity information during a predetermined period using a deep learning model generated based on data about an electricity price and an electricity demand, deriving an ESS operating policy by a reinforcement learning model based on the forecasted electricity information and state information of an energy storage device included in the ESS, and controlling the ESS based on the derived ESS operating policy.

11 Claims, 14 Drawing Sheets

ESS operator model for the electricity market: (left) charging mode, (right) discharging mode.

(56) References Cited

OTHER PUBLICATIONS

Korean Office Action for Korean Application No. 10-2021-0192771, dated Jun. 12, 2023.
Korean Notice of Allowance for Korean Application No. 10-2021-0192771, dated Aug. 29, 2024, with partial English translation.

\* cited by examiner

[FIG. 1]
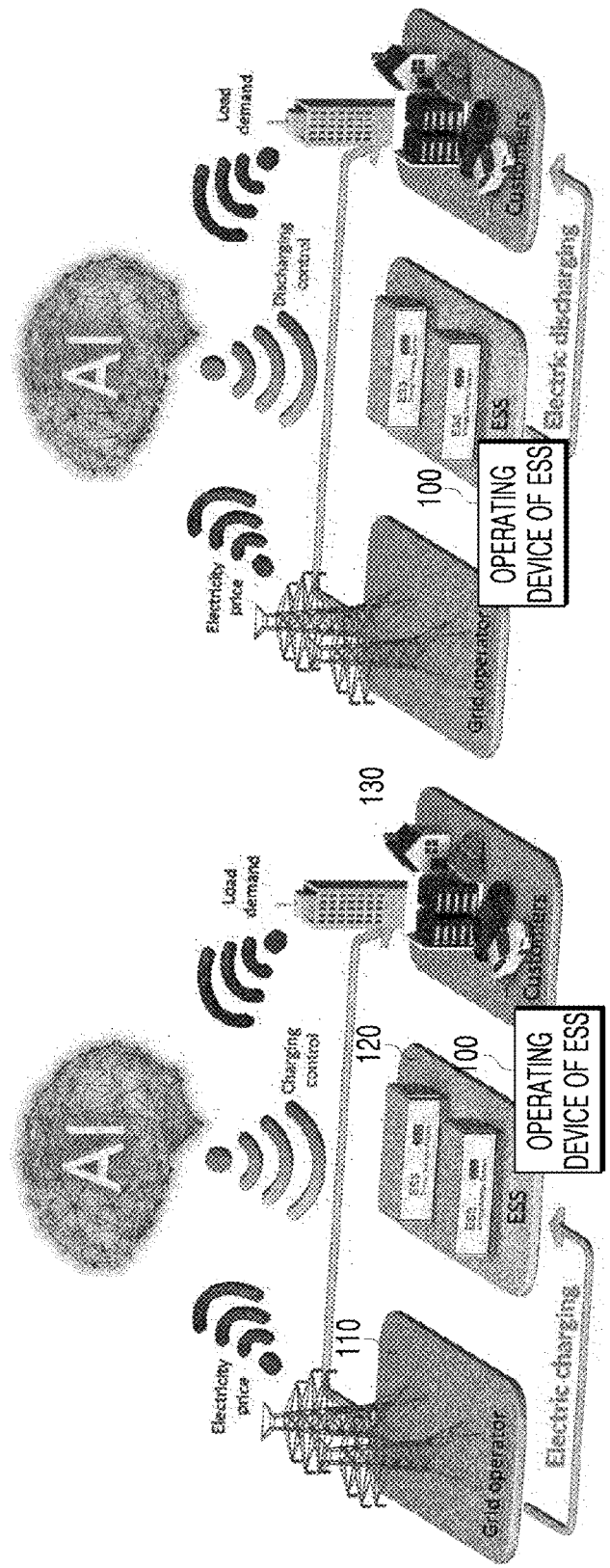
ESS operator model for the electricity market: (left) charging mode, (right) discharging mode.

[FIG. 2]
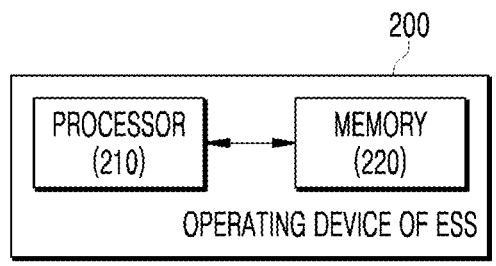
[FIG. 3]
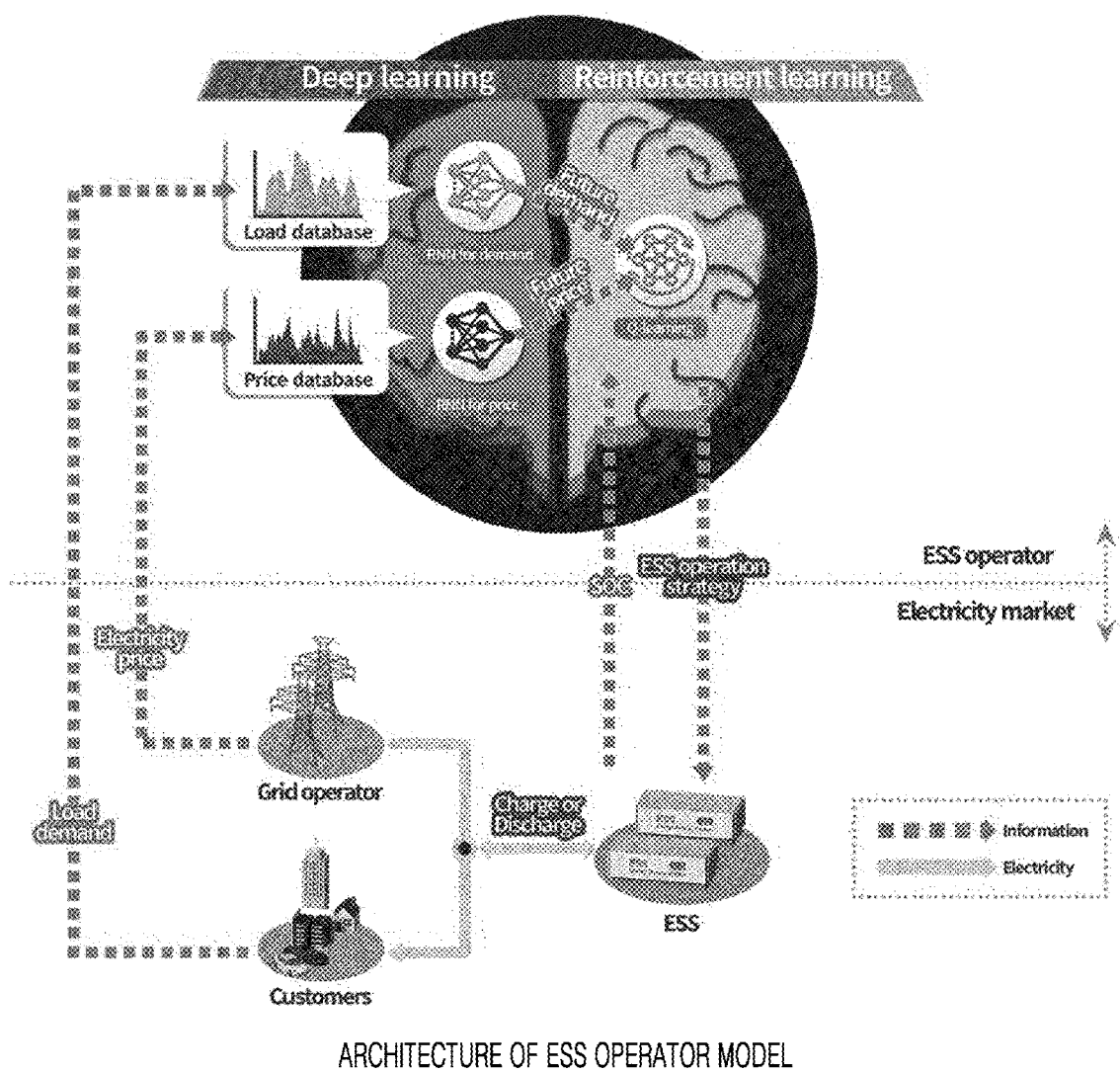
ARCHITECTURE OF ESS OPERATOR MODEL

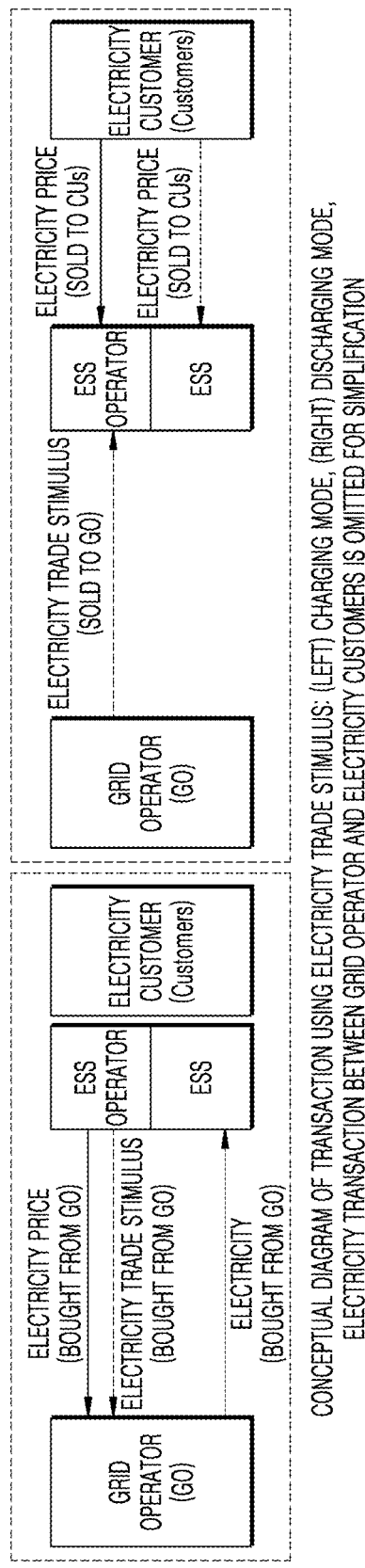
[FIG. 4]

[FIG. 5]

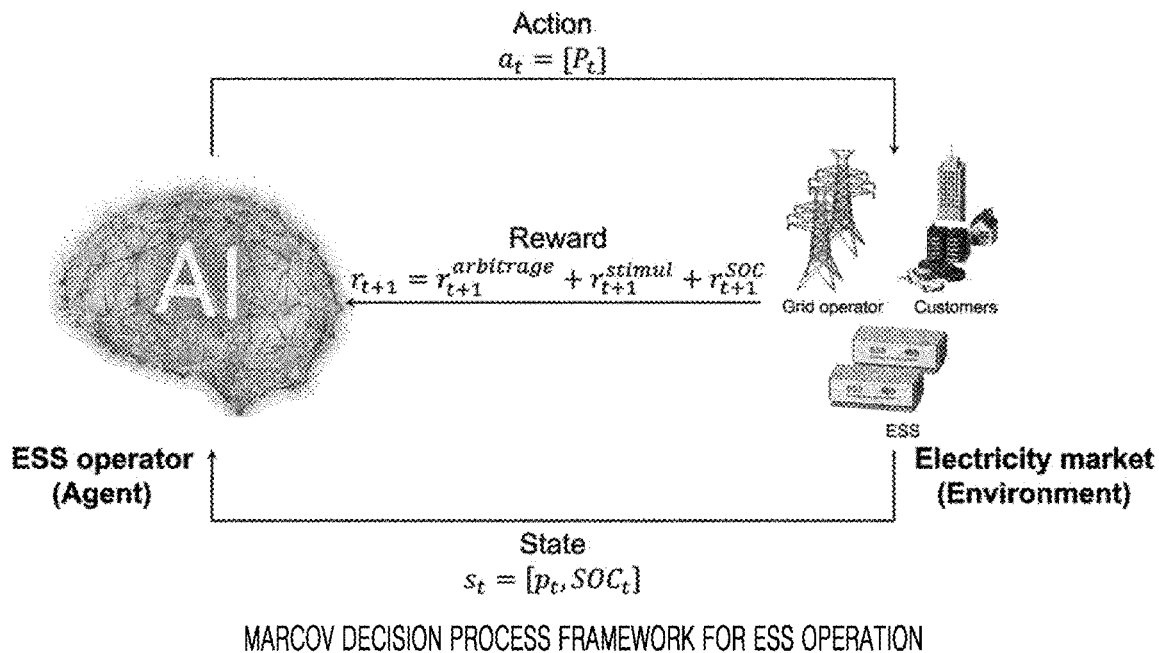

MARCOV DECISION PROCESS FRAMEWORK FOR ESS OPERATION

[FIG. 6]

HYPER-PARAMETERS OF DEEP NEURAL NETWORK

Table 1
HYPER-PARAMETERS OF DEEP NEURAL NETWORK

| HYPER-PARAMETER | RANGE | REMARK |
|---|---|---|
| NUMBER OF HIDDEN LAYERS | [2,3] | – |
| NEURON TYPE OF HIDDEN LAYER | [simple RNN, LSTM, GRU] | RNN TYPE |
| NUMBER OF NEURONS OF HIDDEN LAYER | [2, 4, 8, 16, 32, 64, 128] | |
| DROPOUT RATIO OF HIDDEN LAYER | [0, 0.1, 0.2] | RECURRENT DROPOUT INCLUDED (Recurrent Dropout) |
| ACTIVATION FUNCTION OF OUTPUT | [linear, tanh] | – |
| INPUT SEQUENCE LENGTH OF | [0.0001, 0.001, 0.01, 0.1] | SCALE ELECTRICITY WITH 24-HOURS INCREMENT |
| LEARNING RATE(Learning rate) | [72, 96, 120, 168, 240, 336] | |

[FIG. 7]

Table 2
ALGORITHM FOR ESS OPERATOR

| Algorithm: ESS operator algorithm with an RNN and RL |
|---|
| 1. Set hyperparameters |
| 2. For $h = 0, H$, do: |
| 3.     # RNN for price forecasting |
| 4.     Price data ← updatePrice() |
| 5.     Price data ← preprocess(Price data) |
| 6.     Future prices ← pretrained price RNN(Price data) |
| 7.     # RNN for load forecasting |
| 8.     Load data ← updateLoad() |
| 9.     Load data ← preprocess(Load data) |
| 10.     Future loads ← pretrained load RNN(Load data) |
| 11.     # RL for decision making |
| 12.     Set RL model parameters |
| 13.     Initialize Q values as zeros |
| 14.     For $i = 0, N$, do: |
| 15.        Initialize state as $s_0 = (p_0, SOC^{init})$ |
| 16.        For $t = 0, t_{max}$, do: |
| 17.           Select action $a_t$ with ε-greedy policy |
| 18.           Receive reward $r_{t+1}$, and observe next state $s_{t+1}$ in the environment |
| 19.           Update Q values with $(s_t, a_t, r_{t+1}, s_{t+1})$ and Eq. (19) |
| 20.        End for |
| 21.     End for |
| 22.     Derive optimal action at $h$ |
| 23. End for |

[FIG. 8]

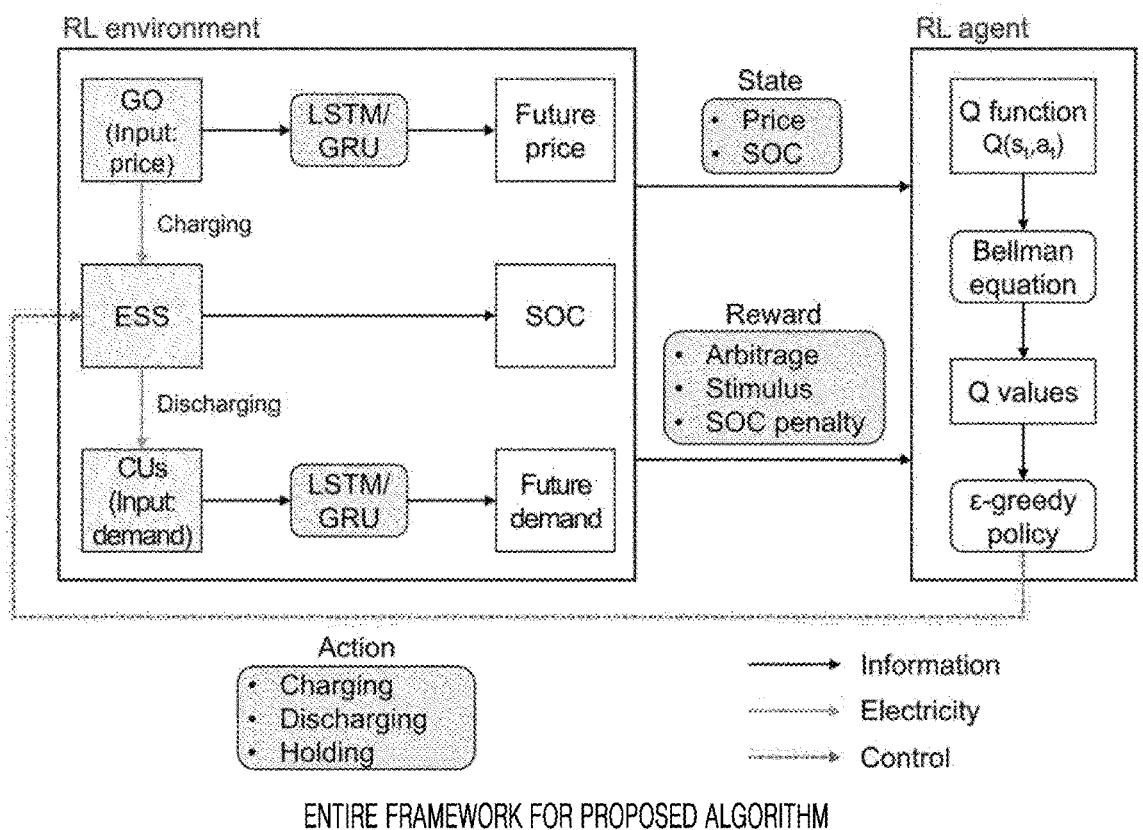

ENTIRE FRAMEWORK FOR PROPOSED ALGORITHM

[FIG. 9]

Table 3
ESS MODEL PARAMETERS

| Parameter | Value | Remark |
|---|---|---|
| Capacity of ESS $C^{ESS}$ [MWh] | 93 | 3-hour capacity w/o a GO |
| $P^{cha,max}$ [MW] | $0.25 C^{ESS}$ | 0.25 C-rate of Li-ion battery |
| $P^{dis,max}$ [MW] | $E^{load,min}$ | CUs load demand |
| Charging efficiency of ESS $\eta^{cha}$ | 0.95 | Li-ion battery |
| Discharging efficiency of ESS $\eta^{dis}$ | 0.95 | Li-ion battery |
| Lower bound of SOC $SOC^{min}$ | 0.15 | Li-ion battery |
| Upper bound of SOC $SOC^{max}$ | 0.85 | Li-ion battery |
| Initial state of SOC $SOC^{init}$ | 0.2 | -- |

[FIG. 10]
Table 4
STIMULUS FACTOR IN DIFFERENT PERIODS
| Period | Time (h) | Stimulus factor ($\varphi_t$) |
|---|---|---|
| Off-peak | 00:00 ~ 06:00 | 0.5 |
|  | 22:00 ~ 23:00 |  |
| Mid-peak | 07:00 ~ 16:00 | 0.7 |
| On-peak | 17:00 ~ 21:00 | 0.9 |
[FIG. 11]
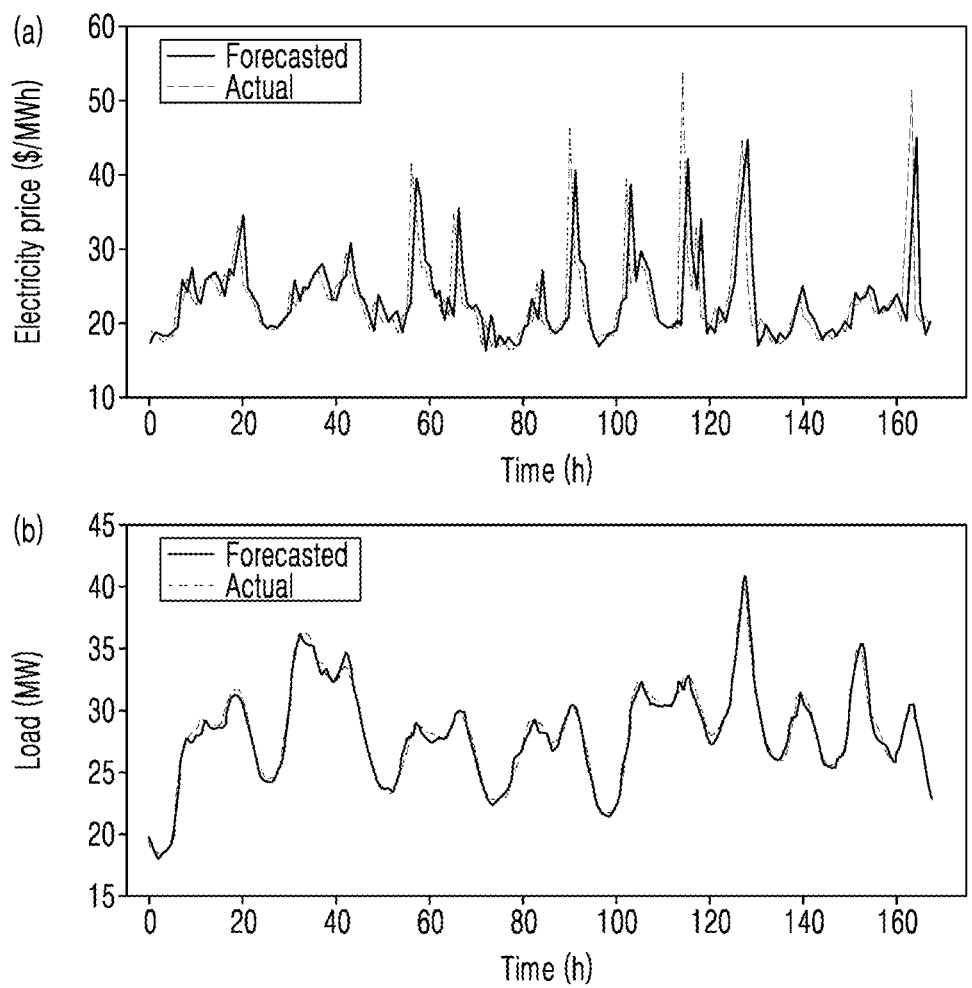
RNN BASED FORECASTING RESULT ON 2018,
(a) WHOLESALE ELECTRICITY PRICE (b) LOAD DEMAND

[FIG. 12]

Table 5

QUANTITATIVE EVALUATION OF RNN MODEL FORECASTING RESULTS

|  | RMSE | MAE |
|---|---|---|
| Electricity price forecasting model | 0.2138 | 0.1379 |
| Load forecasting model | 0.0631 | 0.0481 |

[FIG. 13]

Table 6

HYPER-PARAMETERS OF RL TRAINING

| Hyperparameter | Value |
|---|---|
| Discount factor $\gamma$ | 0.99 |
| Learning rate $\alpha$ | 0.5 |
| Initial exploration ratio $\epsilon^{init}$ | 1.0 |
| Minimum exploration ratio $\epsilon^{min}$ | 0.001 |
| Exploration step $M$ | 250,000 |
| Episodes $N$ | 300,000 |

[FIG. 14]

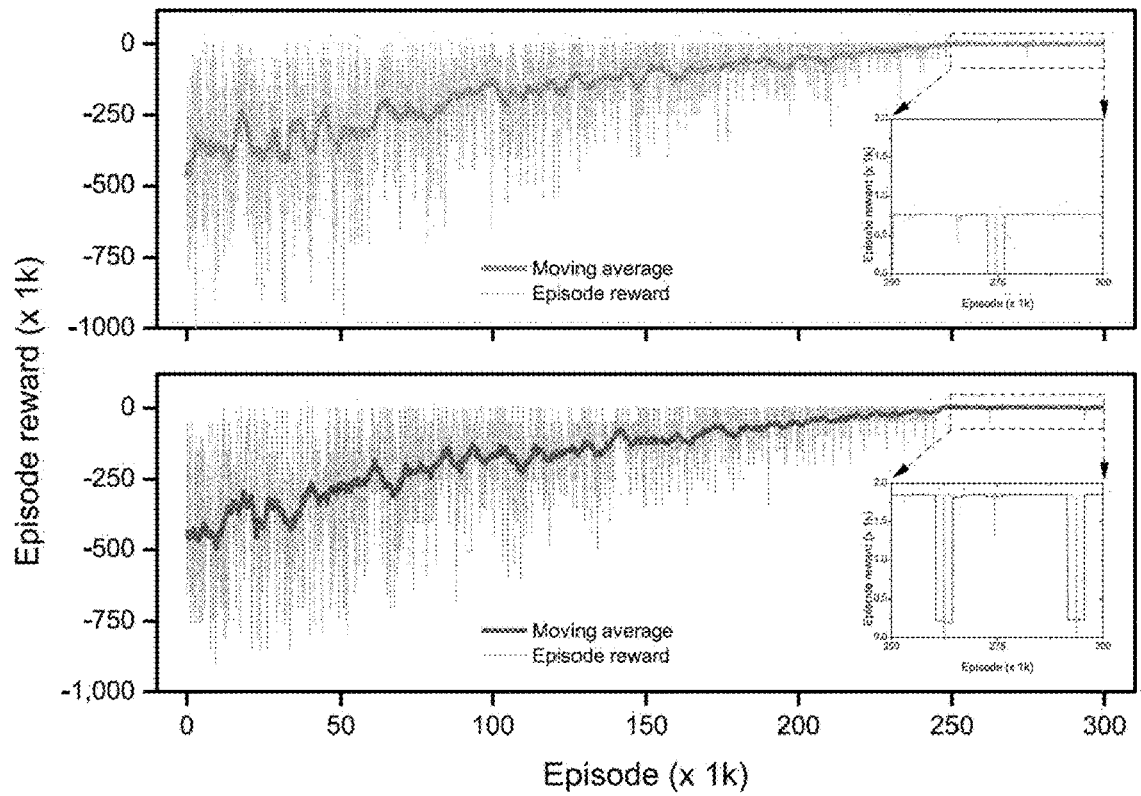

[FIG. 15]
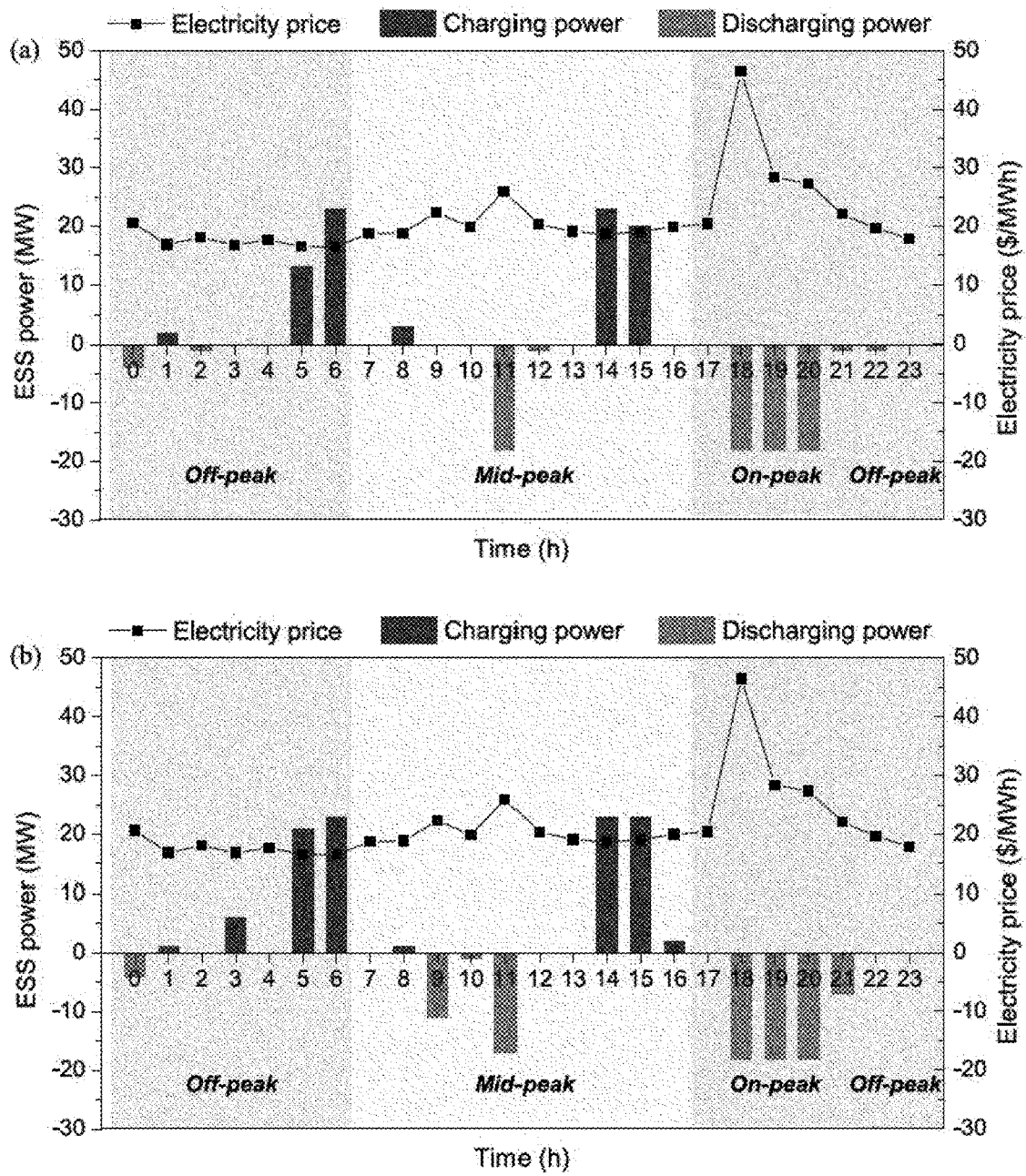

[FIG. 16]
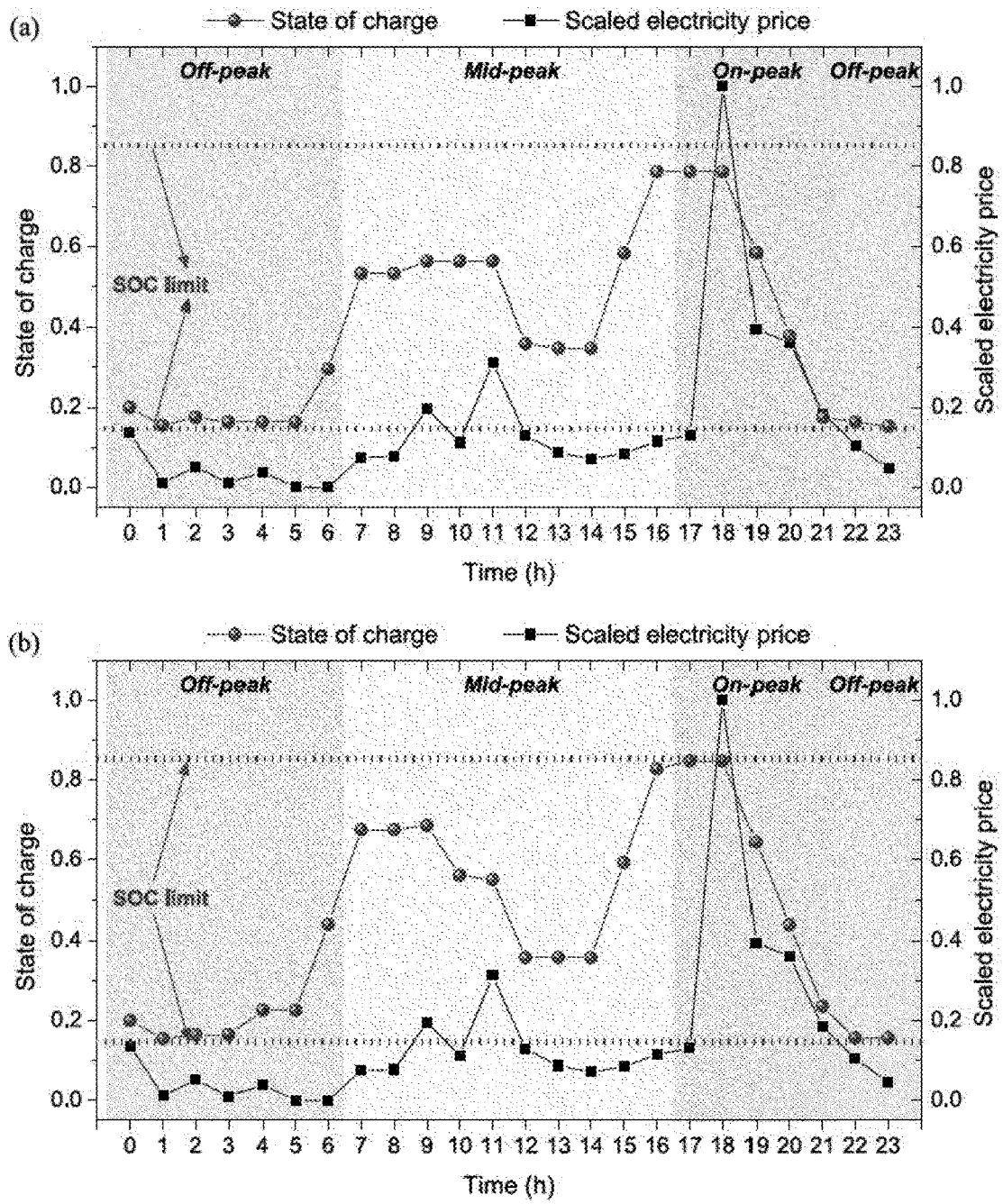

[FIG. 17]
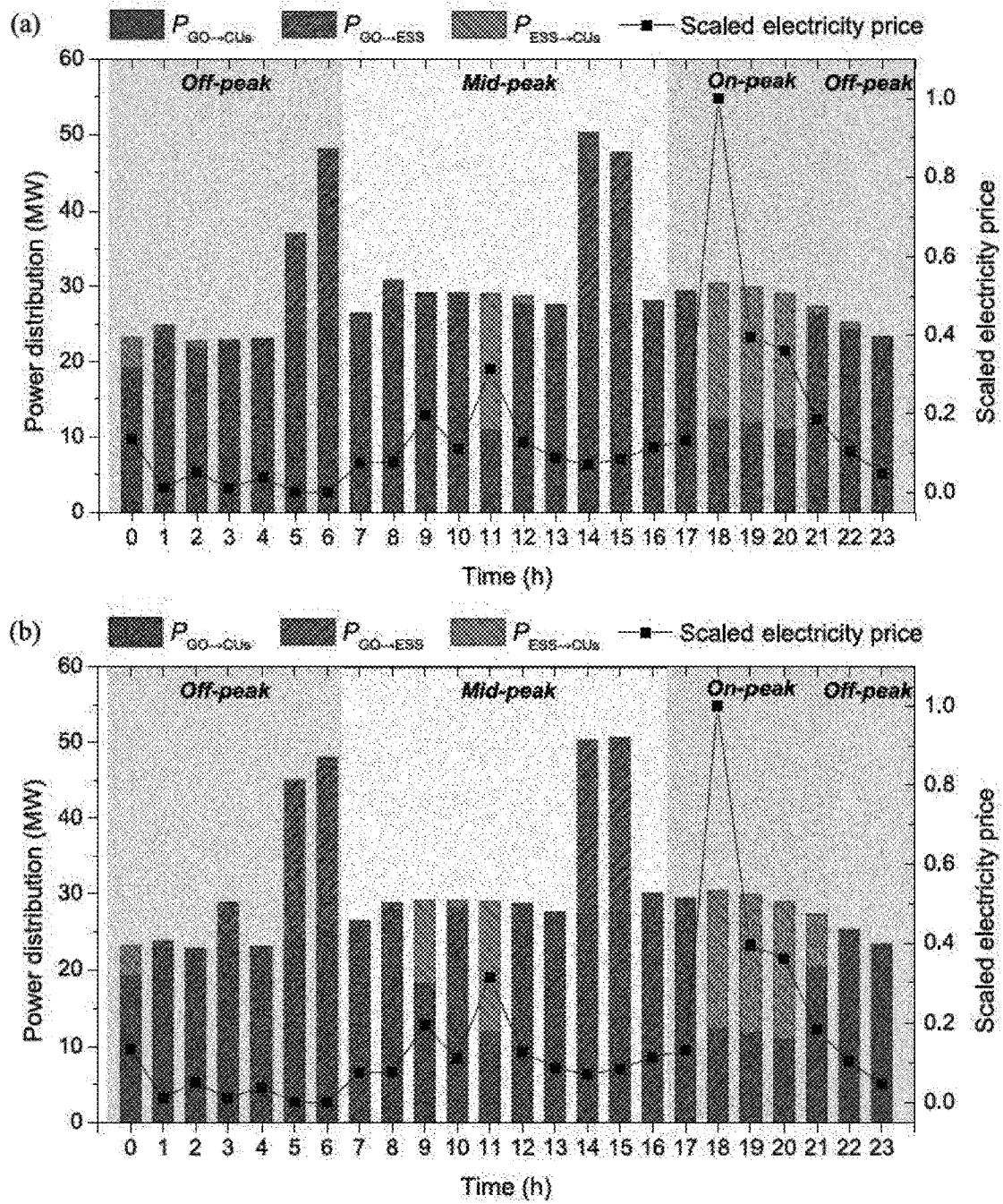

[FIG. 18]

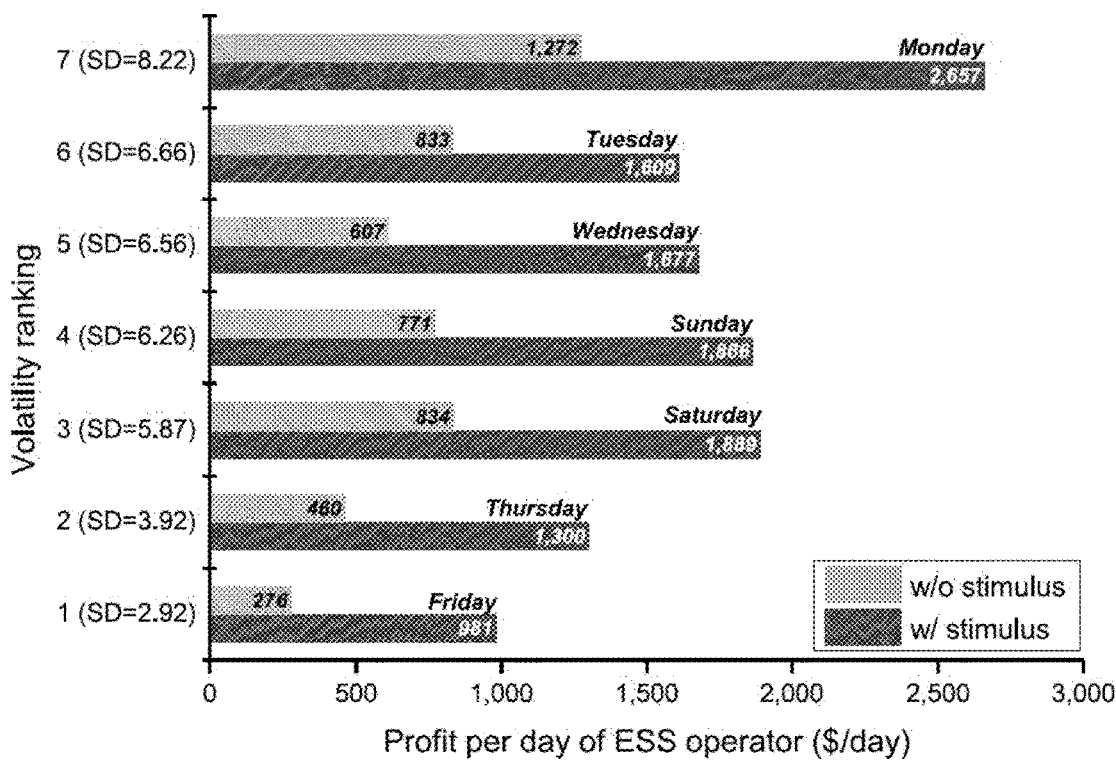

[FIG. 19]

Table 7
SUMMARY OF FINANCIAL STATEMENT OF ESS OPERATOR

|  | Without stimulus | With stimulus | |
|---|---|---|---|
| Average net energy balance of ESS in off-peak [MWh] | 40.3 | 53.1 | |
| Average net energy balance of ESS in mid-peak [MWh] | -9.3 | -1.7 | |
| Average net energy balance of ESS in on-peak [MWh] | -26.6 | -45.9 | |
| Profit source | arbitrage | arbitrage | stimulus |
| Average profit in off-peak [$] | -677.7 | -938.4 | -469.2 |
| Average profit in mid-peak [$] | 436.7 | 279.2 | 195.5 |
| Average profit in on-peak [$] | 950.4 | 1391.7 | 1252.5 |
| Payback year [y] | 35.9 | 14.9 | |

[FIG. 20]
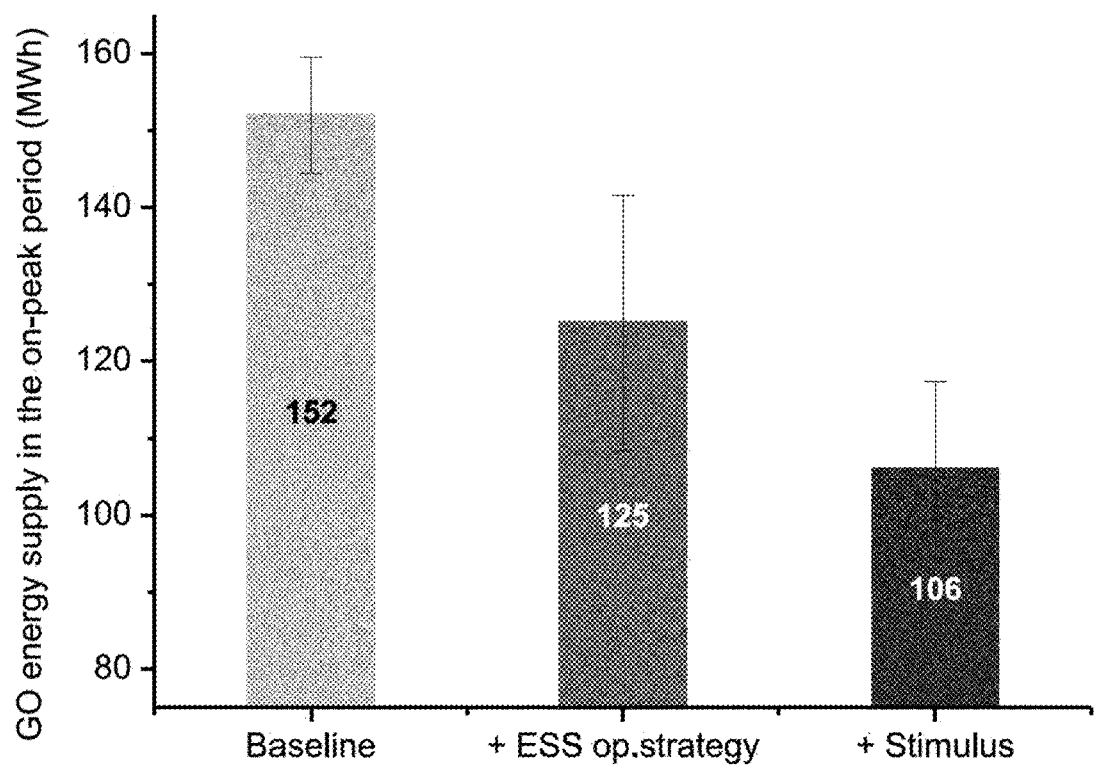
RESULT OF COMPARING DAILY BENEFIT OF ESS OPERATOR ACCORDING TO
VOLATILITY RANGING IN FEBRUARY 25 TO 28, 2018

[FIG. 21]
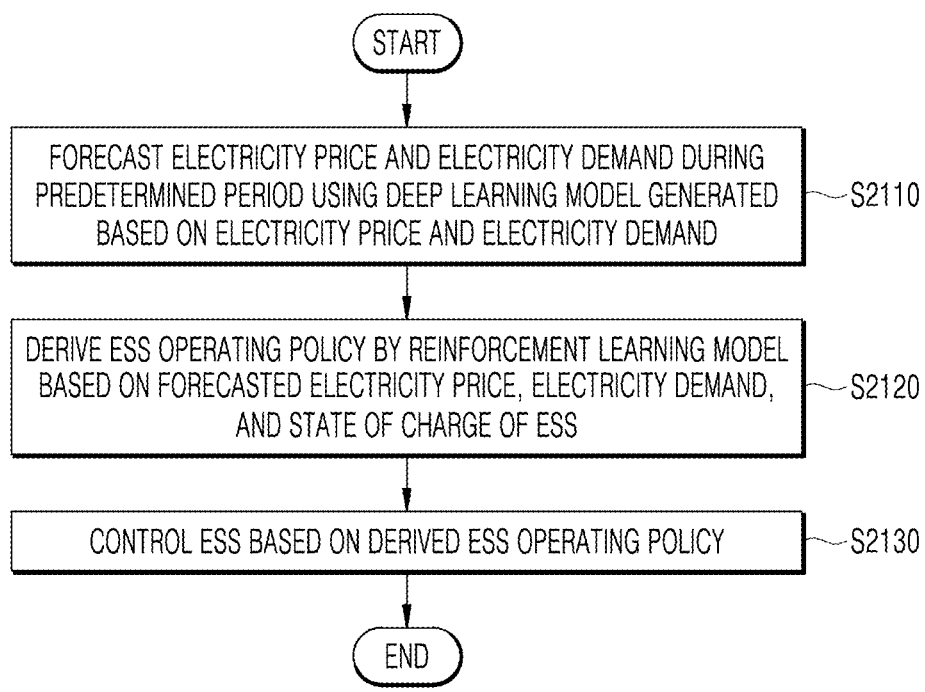

APPARATUS AND METHOD FOR OPERATING ENERGY STORAGE SYSTEM

CROSS-REFERENCE TO RELATED APPLICATION

This present application claims the benefit of priority to Korean Patent Application No. 10-2021-0192771, entitled "APPARATUS AND METHOD FOR OPERATING OF ENERGY STORAGE SYSTEM" filed on Dec. 30, 2021, in the Korean Intellectual Property Office, the entire disclosure of which is incorporated herein by reference.

FIELD

The present disclosure relates to a technology which efficiently operates an energy storage system (ESS). The present invention resulted from "Development of new and renewable energy-based plus energy community platform for urban development" of "Support for research and operation expenses of Korea Energy Research Institute (R&D)" supported by the Ministry of Science and Technology Information and Communication of South Korea (Project No.: 1711124706).

BACKGROUND

While the need for sustainable energy sources is increasing due to global warming, a power generation capacity through renewable energy is greatly increasing worldwide to reduce greenhouse gas.

The power generation by the renewable energy is greatly affected by the environmental condition so that the volatility over time is relatively larger than that of the conventional thermal power plants. The inconsistency between the power supply and demand may lead to additional power generation or waste of power, higher increase in electricity prices, and threats to grid reliability.

According to the related art (Korean Unexamined Patent Application Publication No. 10-2021-0092581), it is possible to provide a high energy efficiency by analyzing the electricity demand of the user and scheduling an operation of cogeneration, but a method of utilizing the ESS is never considered.

Accordingly, a technology for efficiently operating the energy storage system (ESS) is necessary to stably provide an energy even in a situation in which both the volatility of the electricity supply and the electricity demand are rapidly increasing.

RELATED ART DOCUMENT

Patent Document

Patent Document: Korean Unexamined Patent Application Publication No. 10-2021-0092581 (published on Jul. 26, 2021)

SUMMARY

An object of the exemplary embodiment of the present disclosure is to efficiently operate the ESS by forecasting electricity information during a predetermined period using a deep learning model, deriving an ESS operating policy by a reinforcement learning model based on forecasted electricity price and the electricity demand included in the forecasted electricity information, and state information of the energy storage device included in the ESS, and then controlling the ESS based on the derived ESS operating policy, thereby stably providing an energy even in a situation in which both the volatility of the electricity supply and the electricity demand are suddenly increasing.

An object of an exemplary embodiment of the present disclosure is to generate a revenue by purchasing the electricity from a grid operating device when the electricity price is relatively low in the operating device of the ESS to charge the electricity in the ESS and providing the electricity of the ESS to a customer unit when the electricity price is relatively high.

An exemplary embodiment of the present disclosure is an operating device of an ESS including: a processor and a memory which is operably connected to the processor and stores at least one code executed in the processor. The memory stores a code which is executed by the processor to cause the processor to forecast electricity information for a first period using a deep learning model generated based on data about an electricity price and an electricity demand, derive an ESS operating policy by a reinforcement learning model based on the electricity information and state information of an energy storage device included in the ESS; and store a code to cause to control the ESS based on the derived ESS operating policy.

Here, the electricity information includes an electricity demand forecasted during the first period, an electricity price, and elasticity the electricity demand with respect to the electricity price and the state information of the energy storage device includes a state of charging, a charging efficiency, and a discharging efficiency of the energy storage device.

Further, an exemplary embodiment of the present disclosure is an ESS operating method performed by an operating device of an energy storage system (ESS) including: forecasting electricity information for a first period using a deep learning model generated based on data about an electricity price and an electricity demand; deriving an ESS operating policy by a reinforcement learning model based on the forecasted electricity information and state information of an energy storage device included in the ESS; and controlling the ESS based on the derived ESS operating policy.

Other aspects, features, and advantages other than those described above will become apparent from the following drawings, claims, and the detailed description of the present disclosure.

According to the exemplary embodiment of the present disclosure, as electricity information during a predetermined period, an electricity price and an electricity demand are forecasted using a deep learning model, an ESS operating policy is derived by a reinforcement learning model based on the forecasted electricity price and the forecasted electricity demand, and a state of charge of the ESS, and then the ESS is controlled based on the derived ESS operating policy to efficiently operate the ESS, thereby stably providing an energy even in a situation in which both the volatility of the electricity supply and the electricity demand are suddenly increasing.

Further, according to the exemplary embodiments of the present disclosure, when the electricity price is relatively low in the operating device of the ESS, the electricity is bought from the grid operating device to be charged in the ESS and when the power price is relatively high, the electricity of the ESS is provided to a customer unit to generate a revenue and stimulate the more efficient electricity transaction in the overall electricity supply system.

BRIEF DESCRIPTION OF THE DRAWINGS

The above and other aspects, features, and advantages of the present disclosure will become apparent from the detailed description of the following aspects in conjunction with the accompanying drawings, in which:

FIG. 1 is a view illustrating an operating environment of an energy storage system (ESS) according to an exemplary embodiment of the present disclosure;

FIG. 2 is a view illustrating an example of a configuration of an operating device of an ESS according to an exemplary embodiment of the present disclosure;

FIG. 3 is a view for explaining an example of an operation of an ESS operator (EO) according to an exemplary embodiment of the present disclosure;

FIG. 4 is a view illustrating a concept of an electricity transaction according to an electricity transaction stimulus;

FIG. 5 is a view for explaining a Markov decision process (MDP) for a framework in an operating device of an ESS according to an exemplary embodiment of the present disclosure;

FIG. 6 is a view illustrating an example of a hyperparameter used for an RNN model;

FIG. 7 is a view illustrating an algorithm of an electricity transaction stimulus-integrated arbitrage strategy using an RNN and an RL;

FIG. 8 is a view illustrating an overall form of an algorithm of an electricity transaction stimulus-integrated arbitrage strategy using an RNN and an RL;

FIG. 9 is a view illustrating an example of a parameter used for ESS modeling;

FIG. 10 is a view illustrating an example of a factor of an electricity transaction stimulus;

FIG. 11 is an example of a result of comparing a forecasted electricity price and a load demand with an actual value;

FIG. 12 is a view illustrating a quantitative evaluation of a forecasting accuracy using RMSE and MAE;

FIG. 13 is a view illustrating an example of a hyperparameter used for a Q learning;

FIG. 14 is a view illustrating a compensation result before and after applying an electricity transaction stimulus;

FIG. 15 is a view illustrating an optimal ESS operation result according to an electricity transaction stimulus;

FIG. 16 is a view illustrating an electricity price before and after applying the SOC of the ESS and an electricity transaction stimulus over time;

FIG. 17 is a view illustrating electricity market distribution and an electricity price before and after an electricity transaction stimulus;

FIG. 18 is a view illustrating a result of comparing profits per day of an EO according to a volatility ranking during a set period;

FIG. 19 is a view illustrating a financial state of an EO in view of each peak period and a power transaction stimulus;

FIG. 20 is a view illustrating an average on-peak power reduction effect during a predetermined period; and FIG. 21 is a flowchart illustrating an ESS operating method according to an exemplary embodiment of the present disclosure.

DETAILED DESCRIPTION OF THE EMBODIMENT

Advantages and characteristics of the present disclosure and a method of achieving the advantages and characteristics will be clear by referring to exemplary embodiments described below in detail together with the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In describing the present disclosure, when it is determined that a detailed description of related well-known technology may obscure the gist of the present disclosure, the detailed description thereof will be omitted.

Terms used in the present application are used only to describe specific exemplary embodiments, and are not intended to limit the present disclosure. A singular form may include a plural form if there is no clearly opposite meaning in the context. In the present application, it should be understood that the term "include" or "have" indicates that a feature, a number, a step, an operation, a component, a part or the combination thereof described in the specification is present, but do not exclude a possibility of presence or addition of one or more other features, numbers, steps, operations, components, parts or combinations, in advance. Terminologies such as first or second may be used to describe various components but the components are not limited by the above terminologies. The above terms are used only to distinguish one component from the other component.

Hereinafter, exemplary embodiments according to the present disclosure will be described in detail with reference to the accompanying drawings, and the same or corresponding constituent elements are denoted by the same reference numerals regardless of a sign of the drawing, and duplicated description thereof will be omitted.

FIG. 1 is a view illustrating an operating environment of an energy storage system according to an exemplary embodiment of the present disclosure.

Referring to FIG. 1, an operator or an operating device (ESS operator: EO) 100 receives information about the electricity from a grid operator or operating device (grid operator: GO) 110, an ESS 120, an electricity customer (consumer) or consumer device (customers: CU) 130 and may derive an optimal ESS operating strategy by means of an artificial intelligence (AI) technology. The EO 100 buys the electricity from the GO 110 when the electricity price is low to charge the ESS 120 and then discharges the ESS 120 when the electricity price is high and sells the power to the CU 130 to seek the profit. Such a profit seeking strategy is based on a market margin of the electricity price so that it is necessary for the EO 100 to accurately forecast a future electricity price and demand. Further, the EO 100 may determine the charge/discharge amount by comprehensively considering factors affecting the durability and financial profit of the ESS.

Further, the EO 100 may maximize the business profit by considering not only profits in the near future (for example, one day), but also profits in the distant future (for example, one week or one month).

The operating device 100 of the ESS according to the exemplary embodiment may be located at the outside of the ESS 120, but is not limited thereto so that it may be located inside of the ESS 120.

FIG. 2 is a view illustrating an example of a configuration of an operating device of an ESS according to an exemplary embodiment of the present disclosure.

Referring to FIG. 2, the operating device of an ESS 200 according to an exemplary embodiment of the present disclosure may include a processor 210 and a memory 220.

The processor 210 may forecast an electricity price and an electricity demand for a predetermined period using a deep learning model generated based on the electricity price and the electricity demand. The processor 210 derives an ESS operating strategy by means of the reinforcement learning model based on the forecasted electricity price, electricity demand, and the state of charge of the ESS and may control the ESS based on the derived ESS operating strategy.

The processor 210, as an ESS operating policy, may derive to buy the electricity from the grid operator when it is not an electricity demand peak period according to the forecasted electricity information to charge the electricity supplied from the grid operating device in an energy storage device of ESS and sell the electricity to the electricity customer from the energy storage device when it is a peak period to discharge the electricity stored in the energy storage device of the ESS to supply the electricity to the load of the customer. Here, when it is derived to buy and charge the electricity and sell the electricity to supply to the load of the customer, it may mean that a purchase timing of the electricity and an amount of electricity at the time of purchase and a selling timing of the electricity and an amount of electricity at the time of selling are determined. At this time, the processor 210 may buy the electricity at a price below a first set value when it is not a peak period and may sell the electricity at a price above a second set value when it is a peak period. The peak period may be set in advance based on an amount of electricity consumed hourly in one day.

As the ESS operating policy, when the processor 210 buys the electricity from the grid operating device, the processor may derive to buy an electricity transaction stimulus together and when the electricity is sold to the customer device, sell the electricity transaction stimulus to the grid operating device. Here, the electricity transaction stimulus may be a profit acquired from an hourly electricity arbitrage and the price of the electricity transaction stimulus may be determined based on elasticity of an electricity demand with respect to the electricity price at the time of transaction, the electricity price, the charging/discharging efficiency of the energy storage device, and an amount of traded electricity.

Further, the processor 210, as the ESS operating strategy, charges or discharges the ESS such that the charged amount of ESS does not deviate from a predetermined range to improve the durability of the ESS.

The memory 220 is operably connected to the processor 220 and may store at least one code executed in the processor 220.

FIG. 3 is a view for explaining an example of an operation of an ESS operator (EO) according to an exemplary embodiment of the present disclosure.

Referring to FIG. 3, the EO may collect electricity price information from the GO, electricity demand information from the CU, and state of charge (SOC) information from the ESS at every set cycle. The EO may perform the deep learning step and the reinforcement learning (RL) step.

In the deep learning step, the EO collects the electricity price and load demand data to make a database and then may forecast future price and demand using each RNN. In the present disclosure, the RNN is described as an example of the algorithm used for forecasting, but as the algorithm used for forecasting, various deep learning algorithms, such as a transformer, as well as the RNN, may be used. Data about the collected electricity price and electricity demand may be collected from an area to which the electricity is supplied by the grid and the ESS. In the RL section, the EO may determine a future optimal charging/discharging electricity of the ESS based on the forecasted price, the forecasted electricity demand, and the state of charge (SOC) information using a Q-learning method. In the present disclosure, even though the Q learning has been described as an example of a reinforcement learning algorithm which derives an optimal policy, as an algorithm for deriving an optimal policy, various reinforcement learning algorithms such as deep Q network (DQN) based double DQN (DDQN) and a policy network based asynchronous advantage actor-critic (A3C) may be used. The arbitrage revenue acquired by the EO during a predetermined time h may be represented in Equation 1.

$$R_h^{arbitrage} = \sum_{t=0}^{t_{max}} -p_t \cdot \left( \frac{P_t^{cha}}{\eta^{cha}} + P_t^{dis} \cdot \eta^{dis} \right) \quad \text{[Equation 1]}$$

Here, $t \in \{0, 1, 2, \ldots, t_{max}\}$ indicates a considered time step index and $t_{max}$ is a final time step considered at time h (that is, when data to be considered is one day, $t_{max}=23$). And $p_t$ may be an electricity price per unit electricity in each time step t. $P_t^{cha}$ and $P_t^{dis}$ indicate an electric energy (charged) bought from the GO and an electric energy (discharged) sold to the CU in the step t, respectively.

When the profit is calculated, the charging is denoted by a reference symbol +, and the discharging is denoted by a reference symbol −, so that the EO may add the profits as represented in Equation 1. The EO should buy more electricity in consideration of the charging loss during the charging process and the profit varies depending on the discharging loss so that a charging efficiency $\eta^{cha}$ and a discharging efficiency $\eta^{dis}$ of the ESS may be considered. Here, the charging and the discharging are not generated simultaneously in each time step. If there is no charged amount or discharged mount during a specific time, the value of the charged amount or discharged amount may be set to 0.

As the ESS needs to maintain a set durability, the EO may consider the SOC of the ESS to determine a charged electric energy or a discharged electric energy in each time step. The SOC of the ESS may be represented by Equation 2 and may have a characteristic represented by Equation 3.

$$SOC_t = SOC_{t-1} + \frac{1}{C^{ESS}} \cdot \left( P_t^{cha} \cdot \eta^{ha} - \frac{P_t^{dis}}{\eta^{dis}} \right) \quad \text{[Equation 2]}$$

$$SOC^{min} < SOC_t < SOC^{max} \quad \text{[Equation 3]}$$

Here, the SOC in the time step t may be determined by the SOC value and the charged/discharged electric energy in a previous time step t−1. In Equation 2, a constant $C^{ESS}$ indicates a total capacity of the ESS. Further, in Equation 3, $SOC^{min}$ and $SOC^{max}$ indicate a lower limit and an upper limit of the SOC, respectively. When the $SOC_t$ deviates from these boundaries, it may negatively affect the durability of the ESS. Accordingly, the EO may operate the ESS within a range that the SOC satisfies this condition.

In the exemplary embodiment, the EO reduces the electric energy supplied from the GO during a peak time by applying a financial method called "electricity transaction stimulus" and may maximize the operating profit.

The concept of the electricity transaction stimulus is as illustrated in FIG. 4. That is, the EO buys both the electricity and the electricity transaction stimulus from the GO during the charging, and sells the electricity to the CU and the electricity transaction stimulus to the GO during the discharging, respectively. Here, the electricity transaction stimulus may be bought and sold like carbon credits on the computer network, and defined as a trading material designed to record a holder on the computer network as follows:

The electricity transaction stimulus may refer to a value calculated by multiplying a profit obtained from the electricity arbitrage and the electricity transaction stimulus factor $\varphi_t$ at each time h. The electricity transaction stimulus revenue which considers the electricity transaction stimulus factor $\varphi_t$ may be represented by Equation 4.

$$R_h^{stimul} = \sum_{t=0}^{t_{max}} -\varphi_t \cdot p_t \cdot \left( \frac{P_t^{cha}}{\eta^{cha}} + P_t^{dis} \cdot \eta^{dis} \right)$$ [Equation 4]

The price of the electricity transaction stimulus may be derived by referring to Equation 4 which shows a difference between a selling price and a purchase price of the electricity transaction stimulus.

The electricity transaction stimulus factor $\varphi_t$ may be defined by a function of elasticity $\xi_t$ as illustrated in Equation 5.

$$\varphi_t = 1 - \xi_t$$ [Equation 5]

Generally, the elasticity is an indicator indicating how one variable responds to another variable. The elasticity in the demand response (DR) in the smart grid field indicates how much the electricity demand of the electricity customer CU is changed as the electricity price is increased. The larger the elasticity, the higher the elasticity cost so that CU may reduce the demand. The elasticity value may be different over time in the day (for example, different depending on whether the time is not a peak time (off-peak), a mid peak (mid-peak), or a peak (on-peak)).

The demand decreasing tendency is reduced at the peak time so that the elasticity value may also be reduced. The GO provides the EO with a revenue stream which may obtain an additional profits when the electricity is traded so that this term may be set as "stimulus".

Further, the GO switches the electricity supply during the peak time to an off-peak period to lower an electricity generation cost. The point of the stimulus is that the GO provides an additional revenue to the EO with different weights for each peak period of the energy trading. The stimulus factor is low during the off-peak period (low season), but is high during the on-peak period (high season). Accordingly, the EO may charge during the off-peak period when the stimulus can be bought at a low price. Similarly, the EO may discharge at maximum during the peak period when the stimulus may be sold at a relatively high price.

As represented in Equation 6, the EO may maximize the profit in consideration of the arbitrage revenue $R_h^{arbitrage}$ and the stimulus revenue $R_h^{stimul}$ by the optimal electricity trading.

$$\max(R_h^{arbitrage} + R_h^{stimul})$$ [Equation 6]

The EO may maximize the cumulative reward according to the time step in a statistical environment by the reinforcement learning.

First, the ESS arbitrage problem of the power market is formalized by means of the MDP. The ESS arbitrage is defined as a decision-making problem and may be configured by a state, an action, and a reward.

The Q-learning may be utilized as an RL method for obtaining the optimal ESS electricity.

FIG. 5 is a view for explaining a Markov decision process (MDP) for a framework in an operating device of an ESS according to an exemplary embodiment of the present disclosure.

Referring to FIG. 5, the electricity market environment may include an EO (agent), a GO, an ESS, and a CU.

An environment state which needs to be observed by the EO to maximize the profit while maintaining the durability of the ESS is an electricity price and the SOC of the ESS. Accordingly, the environment state may be set as an electricity price and the SOC for every time as illustrated in FIG. 7.

$$s_t = [p_t, SOC_t]$$ [Equation 7]

Here, Pt is a forecasted electricity price at time step t and $SOC_t$ is an SOC value of the ESS at every time to be affected by the action of the EO.

The action of the EO may be defined as an electricity of the ESS as represented in Equation 8. A range of the action value may be between a maximum discharging power $P^{dis,max}$ and a maximum charging power $P^{cha,max}$, as illustrated in Equation 9.

$$a_t = [P_t]$$ [Equation 8]

$$a_t \in [P^{dis,max}, P^{cha,max}]$$ [Equation 9]

The action of the EO may have a negative value for the discharging, a positive value for charging, and 0 for idle revolution. The maximum discharging power $P^{dis,max}$ and the maximum charging power $P^{cha,max}$ may vary depending on the ESS design condition.

The EO may maximize the operating profit. In order to maintain the ESS durability during the charging/discharging, the EO may determine the ESS electricity without departing from the SOC boundary range. To this end, the EO may obtain an immediate reward $r_{t+1}$ in a subsequent time step t+1 after setting the action $a_t$, as in Equation 10.

$$r_{t+1} = r_{t+1}^{arbitrage} + r_{t+1}^{stimul} + r_{t+1}^{SOC}$$ [Equation 10]

Here, $r_{t+1}^{arbitrage}$ refers to an arbitrage reward obtained by the difference of the charging price and the discharging price, $r_{t+1}^{stimul}$ refers to a stimulus reward from the GO, and $r_{t+1}^{SOC}$ refers to a reward associated with an SOC state which is affected by the EO which performs the action in an environment.

$r_{t+1}^{arbitrage}$ and $r_{t+1}^{stimul}$ may be defined as in Equations 11 and 12, respectively.

$$r_{t+1}^{arbitrage} = -p_t \cdot \left( \frac{P_t^{cha}}{\eta^{cha}} + P_t^{dis} \cdot \eta^{dis} \right)$$ [Equation 11]

$$r_{t+1}^{stimul} = -\varphi_t \cdot p_t \cdot \left( \frac{P_t^{cha}}{\eta^{cha}} + P_t^{dis} \cdot \eta^{dis} \right)$$ [Equation 12]

In Equation 13, when the SOC is in the boundary range, the EO assigns a reward factor $F^{reward}$ and when the SOC is out of the boundary range, the EO assigns a penalty factor $F^{penalty}$. As the value of penalty factor $F^{penalty}$ is large, the EO may learn a method of performing an action such that the SOC does not exceed the boundary range.

$$r_{t+1}^{SOC} = \begin{cases} F^{reward} & (SOC^{min} < SOC_t < SOC^{max}) \\ F^{penalty} & (SOC_t \leq SOC^{min} \text{ or } SOC_t \geq SOC^{max}) \end{cases}$$ [Equation 13]

For example, the reward factor $F^{reward}$ may be set to 0 and the penalty factor $F^{penalty}$ may be set to −50000.

An episode set for deriving an optimal action at time h may be configured by a finite time sequence, a state, an action, and a reward (0, $s_0$, $a_0$, $r_1$; 1, $s_1$, $a_1$, $r_2$; ... ; $t_{max}$, $st_{max}$, $at_{max}$, $rt_{max+1}$).

In the Q-learning algorithm, in order to derive the optimal action of the ESS electricity, a cumulative reward for a predetermined finite time step (that is, 24 hour steps per day) may be considered.

The cumulative reward may be defined by Equation 4 and as represented in Equation 15, may be referenced by regressing $G_t$.

$$G_t = \sum_{t=0}^{t_{max}} \gamma^t \cdot r_{t+1} = r_1 + \gamma \cdot r_2 + \ldots \gamma^{t_{max}} \cdot r_{t_{max}+1}$$ [Equation 14]

$$G_t r_{t+1} \gamma \cdot G_{t+1}$$ [Equation 15]

Here, $\gamma \in [0, 1]$ is a discount factor which is a value obtained by multiplying a reward which will be received in the future to convert the future reward into the current reward.

The EO ultimately requires a policy $\pi(s)$ to select an optimal action for the maximum revenue in each state. The Q function defined by Equation 16 refers to a total future reward expected when the EO performs that action $\alpha_t$ in the state $S_t$. Here, $\mathbb{E}$ indicates an expectation. Accordingly, the strategy for finding an optimal policy refers to finding a maximum Q function in the state $S_t$ represented by Equation 17.

$$Q(s_t, a_t) = \mathbb{E}[G_t | s_t, a_t]$$ [Equation 16]

$$\pi^*(s) = \text{argmax}_a Q(s, a)$$ [Equation 17]

Here, $\pi^*(S)$ is an optimal policy of the state S and argmax$_a$ is a function which outputs an index (action a) as a maximum value.

The Q function $Q^{\pi^*}(S_t, a_t)$ of the optimal policy $\pi^*(S)$ may be expressed by the Bellman optimality equation as represented in Equations 16, 17, and 18.

$$Q^{\pi^*}(s_t, a_t) = \mathbb{E}\left[r_{t+1} + \gamma \cdot \max_{a_{t+1} \in A_{t+1}} Q^{\pi^*}(s_{t+1}, a_{t+1}) | s_t, a_t\right]$$ [Equation 18]

$A_{t+1}$ is a series of actions which may be performed at time t+1. However, in order to calculate the expected value in Equation 18, an accurate model including a state transition probability for each state is necessary.

As represented in Equation 19, the Q-learning method is applied to update the Q function to find the optimal policy based on the state-action transition ($s_t$, $a_t$, $r_{t+1}$, $s_{t+1}$).

$$Q(s_t, a_t) \leftarrow$$ [Equation 19]
$$Q(s_t, a_t) + \alpha \cdot \left[r_{t+1} + \gamma \cdot \max_{a_{t+1} \in A_{t+1}} Q(s_{t+1}, a_{t+1}) - Q(s_t, a_t)\right]$$

Here, $\alpha \in [0, 1]$ indicates a learning rate determining how much the newly estimate result is reflected.

The Q-learning is an off-policy learning method in which an acting policy and a policy of updating the Q function are different. The Q-learning is appropriate for the learning to find an optimal policy by updating a Q function having the highest value in the state-action table to the state-action table while searching for various actions.

The Q-learning has an advantage in that the EO directly interacts with the environment and learns only with a state-action transition ($s_t$, $a_t$, $r_{t+1}$, $s_{t+1}$) implemented by the MDP so that an explicit model is not necessary.

In order to derive the optimal ESS electricity at time h, the EO should accurately forecast a future electricity price and a load demand and may calculate the future cumulative reward thereby.

The forecasting model may be set based on the RNN specialized for time-series data, among deep learning technologies. The RNN has a neuron circulating in the form of a memory cell between neurons so that it has better forecasting performance for sequential data with a time sequence having a specific length than the conventional artificial neural network ANN.

The EO may introduce a long short-term memory (LSTM) or gated recurrent unit (GRU) neurons which optimize hyper-parameter related to the model training and are suitable for a long sequence to solve an unstable gradient problem and a limited short-term memory problem in the RNN.

The forecasting model may utilize a total of five to six layers of a network configured by one input layer, two to three RNN based hidden layers, and one output layer. In the input layer, past data to which yearly, monthly, daily, and hourly time characteristics of the electricity demand and the electricity price are reflected may be applied in a predetermined order. The input data may be preprocessed by standardization by converting the data to a value with a mean of 0 and a variance of 1 in the form of a Gaussian distribution, as represented in Equation 20.

$$X^{i,scaled} = \frac{x^i - \text{Mean}(x)}{SD(x)}$$

SD denotes a standard deviation of data and Mean denotes an average value. The standardization is used to achieve better performance because an error of data logging or a large outlier value may disrupt the learning.

In order to optimize the RNN model by the supervised learning method, the following hyper-parameter may be considered. The hyper-parameter may be a number of hidden layers, a type of the neuron, a number of neurons per layer, a drop-out ratio, an activation function of the output layer, a learning rate, and an input sequence length, but is not limited thereto and is as illustrated in Table 1 of FIG. 6. The Adam gradient descent algorithm which shows a fast and stable convergence performance during the entire training sets may be used for optimization. In order to implement a model for achieving a global optimization performance, the hyper-parameter of FIG. 6 (Table 1) is changed to identify a combination of the hyper-parameter which generates an optimal forecasting performance.

In an exemplary embodiment, in order to evaluate the forecasting performance of the RNN model, a root mean square error (RMSE) and a mean absolute error (MAE) may be used and may be defined as represented in Equations 21 and 22.

$$RMSE = \sqrt{\sum_{t=0}^{T} \frac{(y_t^{true} - y_t^{forecast})^2}{T}} \qquad \text{[Equation 21]}$$

$$MAE = \frac{\sum_{t=0}^{T} |y_t^{true} - y_t^{forecast}|}{T} \qquad \text{[Equation 22]}$$

Here, t indicates a time step, T indicates entire time steps, and $y_t^{forecast}$ and $y_t^{true}$ indicate a forecasted value and an actual value in each time step t, respectively.

A detailed algorithm of the power transaction stimulus-integrated arbitrage strategy using RNN and RL performed in the operating device of the ESS according to the exemplary embodiment of the present disclosure is as illustrated in FIG. 7.

FIG. 8 is a view illustrating an overall form of an algorithm of a power transaction stimulus-integrated arbitrage strategy using an RNN and an RL performed in the operating device of the ESS according to the exemplary embodiment of the present disclosure.

Referring to FIG. 8, first, the EO may set a hyper-parameter used for the RNN with RL model. The EO may receive and preprocess the electricity cost and the load demand before time at every time h. After updating an input vector with the preprocessed data, pre-trained RNN may be used to forecast the price and the load demand for a subsequent time (lines 3 to 10 of Table 2 of FIG. 7).

Next, the EO may derive the optimal ESS electricity per hour h based on data forecasted by the RNN and RL models (lines 12 to 22 of Table 2 of FIG. 7).

The RL model parameters of the power transaction stimulus factor, the SOC related factors $SOC^{init}$, $SOC^{min}$, and $SOC^{max}$, and ESS design factors $P^{dis,min}$, $P^{cha,max}$, $C^{ESS}$, $\eta^{dis}$, and $\eta^{cha}$ may be set. Before starting each episode, the Q table and the initial state may be initialized. The initial state S0 may be configured by the forecasted value and an electricity price of an initial time step of $SOC^{init}$. The ESS electricity decision (action) policy may follow ε-greedy policy configured by exploration and exploitation, as in Equation 23.

$$a_t = \begin{cases} \text{random } a_t \in A_t (\varepsilon > \beta) \\ \underset{a_t \in A_t}{\arg\max} \, Q(s_t, a_t)(\varepsilon \le \beta) \end{cases} \qquad \text{[Equation 23]}$$

Here, β∈ [0, 1] is a constant randomly determined and ε refers to a ratio of exploration.

When ε is larger than β, the EQ performs the exploration to perform a random action and when ε is smaller than β, the EQ may perform the exploitation to perform an action corresponding to a highest value of the Q function in a current learning state. In the beginning of the training, a high ratio of exploration is necessary to update the Q function at maximum by taking the random action. The ratio of exploration needs to be reduced to utilize a model for a value calculated as the learning is progressed. The change in the ratio of exploration as the episode is repeated may be represented by Equation 24.

$$\varepsilon = \begin{cases} \varepsilon - \dfrac{\varepsilon^{init} - \varepsilon^{min}}{M}(\varepsilon > \varepsilon^{min}) \\ \varepsilon^{min}(\varepsilon \le \varepsilon^{min}) \end{cases} \qquad \text{[Equation 24]}$$

Here, $\varepsilon^{init}$ is a ratio of initial exploration, $\varepsilon^{min}$ is a minimum ratio of exploration, and M is an exploration step.

When $\varepsilon^{init}$ is larger than $\varepsilon^{min}$, ε may be consistently reduced as it is repeated. The result may be a local maximum value, rather than a global maximum value so that even though the optimization is progressed to some extent, the minimum ratio of exploration $\varepsilon^{min}$ may be set.

After selecting the ESS electricity (action) according to the e-greedy policy, the EO may immediately receive an instant reward $r_{t+1}$ from the electricity market (environment) and observe a next state $s_{t+1}$. Next, the Q function may be updated using Equation 19 having state-action transition ($s_t$, $a_t$, $r_{t+1}$, $s_{t+1}$). This process may be repeated until it reaches the state $s_{t+1}$ of the last time step $t_{max}$ (lines 16 to 20 of Table 2 of FIG. 7). The entire time step is repeated for one episode and this repetition may be repeated until it reaches the number N of episodes (lines 14 to 21 of Table 2). At this time, it is necessary to confirm the convergence of the revenue which is a sum of rewards for one episode. After training all the episodes, the action for the entire time steps at each time h may be obtained. The EO may use only the action in the time step to corresponding to the current time h as the optimal ESS electricity. By doing this, the algorithm passes to the next time to repeat the above-mentioned processes until the last time H (lines 2 to 23 of Table 2 of FIG. 7).

Hereinafter, an application result of the operating device of the ESS according to the exemplary embodiment of the present disclosure will be explained.

In order to model the GO and CU, past data for the electricity price and the load demand of the wholesale electricity market of Pennsylvania-New Jersey-Maryland (PJM) in the united states may be utilized. Specifically, the electricity price may utilize PJM-RTO node data per hour and the load demand may utilize electricity consumption data per hour in the EASTON area.

The ESS modeling may be performed using parameters summarized in FIG. 9 (Table 3). The capacity $C^{ESS}$ of the ESS may be set to a capacity enough to supply the electricity for three hours from the ESS even though the power is shut off to the Eastern area in the EO. A type of the ESS is a lithium ion battery and $P^{cha,max}$, $P^{dis,max}$, $SOC^{min}$, and $SOC^{max}$ which are respective values related to the durability of the lithium ion battery may be selected according to general criteria recommended by the Lithium ion battery association. $P^{dis,max}$ may be set to have the smallest value, among forecasted load demands so as to avoid supplying more electricity than the load demand of the CU. At this time, $P^{dis,max}$ may be limited so as not to exceed 1.0 C-rate in consideration of the durability. The interval between electricities may set discretely to 1.0 MW $\eta^{cha}$ and $\eta^{dis}$. $\eta^{cha}$ and $\eta^{dis}$ may be set based on a round-trip efficiency of the conventional lithium ion battery. The initial state $SOC^{init}$ of the SOC is set to 0.2 so that a case that the electricity is actively charged and discharged for one day may be analyzed. The electricity transaction stimulus factor $\varphi_t$ for the off/mid/on peak periods are illustrated in FIG. 10 (Table 4) and may be recalculated by Equation 5.

The forecasting result of the RNN models for the electricity price and the load demand may be researched. The models are trained and verified using PJM market data from Jan. 1, 2014 to Feb. 11, 2018 by the supervised learning method. Next, the models are tested with data from Feb. 12, 2018 to Feb. 28, 2018 and the RNN model is implemented using Tensorflow which is the existing deep learning framework.

FIG. 11 is a result of comparing a forecasted electricity price and load demand from Feb. 22, 2018 to Feb. 28, 2018 with actual values after optimizing the hyper-parameter of Table 1 and finishing the training and verifying processes. FIG. 10→11 shows that the forecasted value shows a qualitatively similar trend to the actual value. FIG. 12 (Table 5) specifically illustrates a quantitative evaluation of the forecasting accuracy using the RMSE and the MAE. From this result, the MAE value is lower than that of the precedent research using the same type of PJM market data so that it may be confirmed that the model for the RNN is satisfactorily set and trained. As seen from FIG. 11, the fluctuation of the load demand is relatively small and the repeated pattern is relatively simpler than the electricity price. For this reason, it is understood that the forecasting performance for the load data is excellent more than that of the electricity price.

The RL algorithms of FIG. 7 (Table 2) and FIG. 8 are applied to the case from Feb. 22, 2018 to Feb. 28, 2018 and the hyper-parameter used for the Python (version 3.7) Q-learning is as illustrated in FIG. 13 (Table 6).

The algorithm is applied to confirm whether the learning process is performed well from the episode reward as illustrated in FIG. 14. The episode reward is a one-day revenue of the EO. An upper graph of FIG. 14 illustrates a learning process before applying the reward electricity transaction stimulus and a lower graph illustrates a learning process after applying the reward electricity transaction stimulus on February 25. As illustrated in FIG. 14, in the beginning of the learning, the EO searches and shows a lower value for the episode reward and in accordance with the progress of the learning, the value of the episode reward is increased and finally converged. It means that after adding the electricity transaction stimulus, the convergence value is larger than a value before adding the electricity transaction stimulus so that the learning is performed to achieve more profits after adding the electricity transaction stimulus.

In the initial learning step, there is a case in which the episode reward is remarkably low, which may be caused when SOC limit is exceeded in various time steps in one day. When the episode is repeated beyond the search step M, as represented in Equation 24, the search ratio ε may be converged to $\varepsilon^{min}$.

Next, as a result of repeating the exploitation 50000 times to obtain a final convergence value as in FIG. 14, there is a case in which the episode reward is lowered below the convergence value even after 250000 times because the exploration is performed with a minimum ratio of exploration $\varepsilon^{min}$. An optimal ESS output may be derived by the overall learning processes.

FIG. 15 is a view illustrating an optimal ESS operation result according to a power transaction stimulus.

FIGS. 15A and 15B illustrate the optimal ESS electricity and the electricity price before and after the electricity transaction stimulus. The ESS may charge at a relatively low electricity price and discharge at a relatively high electricity price. Specifically, FIG. 15B illustrates that when the electricity transaction stimulus is applied, relatively more charging is generated during the off-peak period and more discharging is generated during the on-peak period.

This is a result derived by acquiring the more immediate reward $r_{t+1}$ by the EO as the electricity transaction stimulus factor is increased from the off-peak to the on-peak.

FIGS. 16A and 16B illustrate the SOC of the ESS and the electricity price before and after applying the electricity transaction stimulus over time. In both cases, the SOC is maintained to be a value between the lower limit of 0.15 and the upper limit of 0.85, which means that the RL is successfully completed. In FIGS. 16A and 16B, the most important difference is that the average SOC is relatively maintained to be high from the off-peak to the mid-peak, so that more electricity is discharged during the peak period to achieve more profits during the economic stimulus. Specifically, the SOC at 17:00 is 0.848 and the SOC at 22:00 is 0.157. That is, as it is inferred from the RL, the most important strategy for maximizing the revenue is that ESS may be charged to the maximum possible range to 17:00 and then discharged to the maximum discharged electricity until it reaches the SOC lower boundary at 18:00 to 21:00.

FIGS. 17A and 17B illustrate the electricity market power distribution and the electricity price before and after the electricity transaction stimulus. When the electricity price is relatively low, an ESS charging load is added (PGO→CUs+ PGO→ESS), the electricity supplied from the GO to the market may be increased. Similarly, when the electricity price is relatively high, the ESS discharging electricity partially replaces the electricity supply of the GO so that the electricity supplied from the GO to the market is reduced (PGO→CU and PESS→CU). The electricity price may be generally determined based on the load demand of the entire grid, rather than the local area (in this case, EASTON area). The high electricity price means that generally there is a high load demand in the entire grid. Accordingly, as the result interpreted from FIGS. 17A and 17B, the proposed electricity transaction stimulus-integrated arbitrage strategy may effectively distribute the peak electricity load of the GO to a low peak in view of the entire grid.

A financial analysis for evaluating an economic benefits of the electricity transaction stimulus-integrated arbitrage is as follows.

FIG. 18 is a result obtained by comparing a profit per day of the EO according to the volatility ranking from Thursday, Feb. 22, 2018 to Wednesday, Feb. 28, 2018. In FIG. 18, SD may be defined based on the standard deviation of the electricity price for one day and the volatility ranking is defined based on the SD value. As seen from FIG. 18, generally, the higher the volatility ranking, the more the revenue achieved by the EO. The EO revenue may be remarkably affected when the SD value has a large price volatility of 2.0 or higher. When the stimulus measure is applied, the profit is increased from a minimum of 1.9 times (Tuesday) to a maximum of 3.6 times (Friday). On Tuesday, the highest electricity price is set at 19:00 to have the relatively small electricity transaction stimulus effect and it may be confirmed that large amount of electricity is discharged in a time zone in which the electricity transaction stimulus factor is smaller than the peak-time. On Friday, the arbitrage revenue is the lowest due to the smallest SD value. However, after applying the stimulus measure, the daily profit of the EO is significantly increased. The discharging electricity of the ESS is significantly moves to the peak period so that even though the price volatility is the lowest, the highest stimulus effect may be achieved.

FIG. 19 (Table 7) provides a financial state of an EO in view of each peak period and a power transaction stimulus. The optimized ESS charged and discharged powers are added to calculate an average net energy balance per peak period. The average profit by the arbitrage and the electricity transaction stimulus in each peak period may be calculated by substituting the determined ESS electricity to Equations 1 and 4. Further, FIG. 19 (Table 7) is obtained by comparing a payback year of the initial investment cost based on the daily revenue. The ESS initial investment cost and the payback year may be estimated to quickly evaluate the economic effect of the stimulus-integrated arbitrage algorithm. A price of the lithium ion battery pack is $100/kWh and this price is a target price which is obtained without considering the operation, the replacement, and other assistant system of a lithium ion battery back in 2028 proposed in 2020 by US Department of Energy (DOE).

Referring to FIG. 19 (Table 7), it took 35.3 years to apply the stimulus. This is ideal for all situations so that when the investment payback year is 35.3 years on average, it means that even though the ESS is installed, there is no substantial economic profit in view of the EO. However, the stimulus is applied so that a total profit increases by an average of 2.4 times and the payback period may be shortened by 58% to 14.9 years compared to 35.3 years of payback period.

FIG. 20 illustrates an average on-peak electricity reduction effect for one week in which the GO supplies the electricity when the proposed strategy is applied. A total electric energy supplied by the GO for one day is almost equal in all cases. However, when the EO arbitrage strategy is applied by focusing on the peak electricity reduction, it may be known that approximately 17.5% of energy is saved. When the stimulus is additionally added, 30.3% of energy based on the baseline may be saved.

At this time, the EO according to the exemplary embodiment of the present disclosure charges ESS more during the off-peak period after applying the stimulus and discharges ESS more during the peak-period to significantly improve the economic benefit of the EO. Further, GO may switch the peak electricity supply the more to the off-peak period. The stimulus-arbitrage transaction may ensure both the benefit of the EO and the grid stability.

FIG. 21 is a flowchart illustrating an ESS operating method according to an exemplary embodiment of the present disclosure.

Referring to FIG. 21, in step S2110, an operating device of the ESS may forecast an electricity price and an electricity demand during a predetermined period using a deep learning model generated based on the electricity price and the electricity demand. Further, the operating device of the ESS may forecast electricity information including the elasticity of the electricity demand with respect to the electricity price, as well as the electricity price and the electricity demand.

That is, the electricity information forecasted for a predetermined period may include an electricity price and an electricity demand which are forecasted for the corresponding period and an elasticity of the electricity demand with respect to the electricity price for every time zone.

In step S2120, the operating device of the ESS may derive the ESS operating policy by means of the reinforcement learning model based on the forecasted electricity information and state information of the energy storage device included in the ESS. Here, the state information of the energy storage device may include a charging efficiency and a discharging efficiency of the energy storage device, as well as the state of charge of the energy storage device. The operating device of the ESS, as an ESS operating policy, may derive to buy the electricity from the grid operator when it is not a peak period to charge the electricity supplied from the grid operator in the ESS and sell the electricity to the customer unit during the peak period to discharge the electricity stored in the ESS to supply the electricity to the customer device. At this time, the operating device of the ESS may buy the electricity at a price below a first set value when it is not a peak period and may sell the electricity at a price above a second set value when it is a peak period. The peak period may be set in advance based on an amount of electricity consumed hourly in one day. Here, the peak period may refer to a period in which the electricity demand exceeds a predetermined electricity demand threshold or a period in which a ratio of supply-to-demand exceeds a predetermined ratio.

The operating device of the ESS, as the ESS operating policy, may derive to buy the stimulus together when the electricity is bought from the grid operating apparatus and sell the stimulus to the grid operating device when the electricity is sold to the customer unit. Here, the stimulus may be a profit acquired from the electricity arbitrage per hour.

Further, the ESS operating device, as the ESS operating policy, charges or discharges the ESS such that the charged amount of ESS is not deviated from a predetermined range to improve the durability of the ESS.

In step S2130, the operating device of the ESS may control the ESS based on the derived ESS operating policy.

In the specification (specifically, claims) of the present disclosure, the terminology "said" or a similar terminology may correspond to both the singular form and the plural form. In addition, when a range is described in the present disclosure, individual values constituting the range are described in the detailed description of the present disclosure as including the disclosure to which the individual values within the range are applied (unless the context clearly indicates otherwise).

The method steps, processes, and operations described herein are not to be construed as necessarily requiring their performance in the particular order discussed or illustrated, unless specifically identified as an order of performance. It is also to be understood that additional or alternative steps may be employed. In the present disclosure, all examples or exemplary terms (for example, and the like) are simply used to describe the present disclosure in detail so that if it is not limited by the claims, the scope of the present disclosure is not limited by the examples or the exemplary terms. Further, those skilled in the art can appreciate that various modifications, combinations, and changes can be made in accordance with the design conditions and factors within the scope of the appended claims or equivalents thereof.

The spirit of the present disclosure is defined by the appended claims rather than by the description preceding them, and all changes and modifications that fall within metes and bounds of the claims, or equivalents of such metes and bounds are therefore intended to be embraced by the range of the spirit of the present disclosure.

What is claimed is:

1. An ESS operating method performed by an operating device of an energy storage system (ESS), comprising:
    forecasting electricity information for a first period using a deep learning model generated based on data about an electricity price and an electricity demand;
    deriving an ESS operating policy by a reinforcement learning model based on the electricity information and state information of an energy storage device included in the ESS; and controlling the ESS based on the derived ESS operating policy,
wherein the deriving of an ESS operating policy includes:
as the ESS operating policy, deriving the electricity to be supplied to the load of the electricity customer by buying an electricity from a grid operator in a period other than an electricity demand peak period according to the forecasted electricity information to charge the energy storage device and selling the electricity from the energy storage device to an electricity customer during the peak period to discharge an electricity stored in the energy storage device, and
as the ESS operating policy, further deriving to buy an electricity transaction stimulus together when the electricity is bought from the grid operator and sell the electricity transaction stimulus to the grid operator whenever the electricity is sold to the electricity customer.

2. The ESS operating method according to claim 1, wherein the electricity information includes an electricity demand forecasted during the first period, an electricity price, and elasticity of the electricity demand with respect to the electricity price.

3. The ESS operating method according to claim 1, wherein the state information of the energy storage device includes a state of charging, a charging efficiency, and a discharging efficiency of the energy storage device.

4. The ESS operating method according to claim 1, wherein the deriving of the electricity to be supplied to the load of the electricity customer includes:
buying the electricity with a price below a first set value in a period other than the peak period and selling the electricity with a price above a second set value during the peak period.

5. The ESS operating method according to claim 1, wherein a price of the electricity transaction stimulus is determined based on the elasticity of the electricity demand with respect to the electricity price at the time of transaction.

6. The ESS operating method according to claim 1, wherein the deriving of an ESS operating policy includes:
as the ESS operating policy, deriving to perform the charging or discharging of the energy storage device such that the charging amount of the energy storage device of the ESS does not deviate from the predetermined range.

7. A non-transitory computer readable recording medium in which a program which is executed by at least one processor to causes the at least one processor to perform the method according to claim 1 is recorded.

8. An operating device of an energy storage system (ESS), comprising:
at least one processor; and
a memory which is operably connected to the processor and stores at least one code executed in the processor,
wherein the memory stores a code which is executed by the processor to cause the processor to forecast electricity information for a first period using a deep learning model generated based on data about an electricity price and an electricity demand, derive an ESS operating policy by a reinforcement learning model based on the forecasted electricity information and state information of an energy storage device included in the ESS, and
control the ESS based on the derived ESS operating policy,
wherein the memory stores a code which causes the processor to as the ESS operating policy, derive the electricity to be supplied to the load of the electricity customer by buying an electricity from a grid operator in a period other than an electricity demand peak period according to the forecasted electricity information to charge the energy storage device, and selling the electricity from the energy storage device to an electricity customer during the peak period to discharge an electricity stored in the energy storage device, and
wherein the memory stores a code which causes the processor to as the ESS operating policy, further derive to buy an electricity transaction stimulus together when the electricity is bought from the grid operator, and sell the electricity transaction stimulus to the grid operator whenever the electricity is sold to the electricity customer.

9. The ESS operating device according to claim 8, wherein the electricity information includes an electricity demand forecasted during the first period, an electricity price, and elasticity of the electricity demand with respect to the electricity price.

10. The ESS operating device according to claim 8, wherein the state information of the energy storage device includes a state of charging, a charging efficiency, and a discharging efficiency of the energy storage device.

11. The ESS operating device according to claim 8, wherein a price of the electricity transaction stimulus is determined based on the elasticity of the electricity demand with respect to the electricity price at the time of transaction.

* * * * *